United States Patent Office 3,285,951
Patented Nov. 15, 1966

3,285,951
ADDUCTS OF 2,3-BUTANEDIOL AND TOLYLENE DIISOCYANATE
Herbert L. Heiss, New Martinsville, W. Va., assignor to Mobay Chemical Company, Pittsburgh, Pa., a corporation of Delaware
No Drawing. Filed Oct. 16, 1962, Ser. No. 231,029
1 Claim. (Cl. 260—471)

This invention relates to organic polyisocyanates and a method of preparing the same. More particularly it relates to an organic polyisocyanate-glycol adduct particularly suitable in the preparation of polyurethane plastics.

It has been heretofore known to react tolylene diisocyanate with monomeric glycols to produce NCO-terminated adducts which can subsequently be used in the production of polyurethane plastics such as foams, elastomers and coatings. These isocyanates have been practical for the purpose for which they are intended, however, no advantage with regard to the physical properties of cured elastomers are exhibited.

It is therefore, an object of this invention to provide organic polyisocyanates which are particularly suitable in the preparation of elastomeric non-porous polyurethane plastics. It is another object of this invention to provide an organic polyisocyanate particularly suitable in the preparation of elastomeric plastics by the millable gum technique. It is a further object of this invention to provide an improved method of making the novel polyisocyanates of this invention. It is still another object of this invention to provide an organic polyisocyanate suitable for curing hydroxyl terminated millable gums.

The foregoing objects and others which will become apparent from the following description are accomplished in accordance with the invention generally speaking by providing an organic polyisocyanate having the formula:

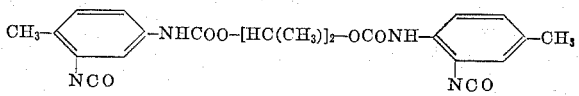

and prepared by reacting at least two mols of tolylene diisocyanate with one mol of 2,3-butanediol having a meso isomer content of at least about 40% plus two times the difference between 100 and the percentage of the 2,4-isomer present in the tolylene diisocyanate. Expressed mathematically the 2,3-butanediol must contain at least 40+2(100—percent of 2,4- tolylene diisocyanate) of the meso isomer.

The 2,3-butanediol exists in two forms, namely, the meso- and the dextro- and/or levo-forms. The amount of the meso-form must equal at least 40% of the total amount of 2,3-butanediol used when the tolylene diisocyanate is 100% of the 2,4-isomer and greater than 40% depending upon the concentration of the 2,4-isomer in the tolylene diisocyanate. Thus, according to the formula set forth above as the percentage of 2,4-isomer in the isocyanate is reduced from 100% to 70% the minimum percentage of meso-2,3-butanediol must rise from 40% to 100%. When the 2,4-isomer is only a portion of all the tolylene diisocyanate present the remainder includes other isomers and is predominately the 2,6-isomer.

In the preparation of the tolylene diisocyanate-2,3-butanediol adduct at least about two mols of the tolylene diisocyanate are reacted with about one mol of 2,3-butanediol. The NCO to OH ratio can vary from 2 to as high as 10 and preferably from 2 to about 4. This reaction can be carried out by any suitable technique known in the art. It is preferable however, that the tolylene diisocyanate be first dissolved in suitable solvent such as a hexane, heptane and the like and the 2,3-butanediol added slowly to this solution over a period of time approximating the reaction rate of the hydroxyl group of the butanediol with the unhindered —NCO group of the tolylene diisocyanate. It is preferred that a catalyst which will promote the reaction of the hydroxyl groups with the —NCO groups be present in the solution to increase both the yield and the rate of reaction of the isocyanate adduct formed. Any suitable catalyst of this type such as those disclosed in an article entitled, "Catalysis of the Isocyanate-Hydroxyl Reaction," J. W. Britain and P. G. Gemeinhardt, Mobay Chemical Co., New Martinsville, West Virginia, vol. IV, issue No. 11, pp. 207–211 (1960) of the "Journal of Applied Polymer Science" may be used in the reaction between the butanediol and the tolylene diisocyanate. As the reaction proceeds the solid adduct will precipitate from the solution. This method is preferred for the reason that the product can be separated from the reaction mixture merely by filtration, decantation or the like. When the 2,3-butanediol contains less than the minimum amount of meso-form as set forth in the formula above, the product does not separate readily from solution but forms a doughy paste. Of course, other suitable techniques for conducting this reaction may be used such as, for example, the addition of the butanediol to the tolylene diisocyanates can be accomplished in a heavy duty mixer wherein the butanediol is added slowly and the reaction is conducted as a mixture of the two components in the presence of small amounts of catalyst.

The invention is further illustrated by the following examples in which parts are by weight unless otherwise specified.

Example 1

About 435 parts of 2,4-tolylene diisocyanate together with about 6 parts of stannous octoate are dissolved in about 1500 ml. of hexane in a flask having a high speed agitator positioned therein. About 112.5 parts of 2,3-butanediol containing 85% of the meso-isomer are added to this solution dropwise over a period of about one-half hour while the solution is continuously agitated. Shortly after the commencement of the introduction of butanediol, the reaction product in the form of a solid white powder begins to precipitate out. After all of the butanediol has been added the agitation is continued for about another hour to insure the complete reaction. The solution is then separated from the solid product by filtration. After drying, 530 g. of a white powder containing 16.9% NCO is obtained.

Example 2

A millable gum is prepared by reacting about 1570 parts of a polypropylene glycol having a molecular weight of about 2,000, about 126 parts of 2,3-butanediol, about 20.3 parts of water, about 549 parts of an isomeric mixture of 80%, 2,4-tolylene diisocyanate, 20%, 2,6-tolylene diisocyanate and about 8.0 parts of stannous octoate. These reactants are admixed by means of a high speed propeller type agitator for about 30 seconds and then poured into a cardboard box wherein forming initially takes place. The cardboard box containing the reaction mixture is then placed in an oven maintained at a temperature of about 90° C. for about 2 hours. After about 10–15 minutes after the mixing of the reaction components has taken place the form collapses to a solid millable gum.

To about 100 parts of this millable gum is added about 6.0 parts of 4,4'-diphenylmethane diisocyanate, the addition being made on a mill such as that used in the rubber industry. The resulting gum is then cured for 30 minutes at 280° F. and gives a product having the following physical characteristics:

| | |
|---|---|
| Tensile (p.s.i.) | 5000 |
| Elongation (percent) | 610 |
| Elongation Set (percent) | ---- |
| Modulus: | |
| 100% | 530 |
| 200% | 790 |
| 300% | 1130 |
| Shore A | 71 |
| Tear (lbs./in.) | 75 |

A second 100 parts of the millable gum is cured in the same manner using 66 parts of the isocyanate prepared in accordance with Example 1. This product exhibits the following characteristics:

| | |
|---|---|
| Tensile (p.s.i.) | 6250 |
| Elongation (percent) | 750 |
| Elongation Set (percent) | ---- |
| Modulus: | |
| 100% | 530 |
| 200% | 790 |
| 300% | 1080 |
| Shore A | 73 |
| Tear (lbs./in.) | 195 |

As shown in Example 2, the millable gums cured utilizing the isocyanate of this invention exhibits improved physical properties over the gum cured with 4,4'-diphenylmethane diisocyanate which is an isocyanate customarily used for this purpose.

*Example 3*

About 236 parts of a polypropylene glycol having a molecular weight of about 2000 is mixed with about 3.0 parts of water, about 0.2 parts stannous octoate and about 130.0 parts of the product prepared in Example 1. The reaction is carried out in about 3 hours at a temperature from about 80 to about 90° C. using a sigma blade mixer. At the end of this time, a gum has been formed which has good millability when cured with about 6 parts of 4,4'-diphenylmethane diisocyanate per 100 parts of gum for 30 minutes at 280 F. The resulting elastomer has a tensile of 4200 p.s.i., elongation of 440%, and a 300% modulus of 1740 p.s.i.

The polyurethane elastomers prepared using the isocyanate adduct prepared in accordance with this invention can be used in preparing articles such as, for example, shoe soles and heels, shock absorbers, vehicle tires, ball joints, injection molding, extrusions, moldings of all types, coatings, foams and the like.

It is of course to be understood that the scope of the invention is not to be limited by the working examples but that any quantity of meso-2,3-butanediol and 2,4-tolylene diisocyanate within the formula set forth produces the composition set forth by simple processing techniques.

Although the invention has been described in considerable detail for the purpose of illustration, it is to be understood that variations can be made by those skilled in the art without departing from the spirit of the invention and scope of the claim.

What is claimed is:

An organic polyisocyanate having the formula

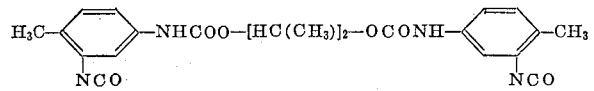

wherein the portion within the brackets is derived from a 2,3-butanediol having a meso-isomer content of at least 40 percent.

References Cited by the Examiner

UNITED STATES PATENTS 2,969,386   1/1961   McElroy _____ 260—471

LORRAINE A. WEINBERGER, *Primary Examiner.*

D. D. HORWITZ, *Examiner.*

V. GARNER, *Assistant Examiner.*